United States Patent [19]

Toy et al.

[11] 3,726,918

[45] Apr. 10, 1973

[54] PROCESS FOR PREPARING ALKYL AND ARYL PHOSPHONOTHIOIC AND PHOSPHINOTHIOIC HALIDES

[75] Inventors: Arthur D. F. Toy, Stamford, Conn.; Eugene H. Uhing, Ridgewood, N.J.

[73] Assignee: Stauffer Chemical Company, New York, N.Y.

[22] Filed: Dec. 1, 1971

[21] Appl. No.: 203,905

[52] U.S. Cl. .............................................. 260/543 P
[51] Int. Cl. ............................. C07f 9/34, C07f 9/42
[58] Field of Search ................................. 260/543 R

[56] References Cited

UNITED STATES PATENTS 3,641,141    2/1972    Schlor ............................. 260/543 P

FOREIGN PATENTS OR APPLICATIONS 747,661    4/1956    United Kingdom ............... 260/543 P

*Primary Examiner*—Lorraine A. Weinberger
*Assistant Examiner*—Richard D. Kelly
*Attorney*—Wayne C. Jaeschke et al.

[57] ABSTRACT

Alkyl or aryl phosphonothioic dihalides and phosphinothioic monohalides are prepared by reacting an alkyl halide or an aryl halide with a pentavalent thiophosphorus compound having at least two halogens attached thereto, and preferably three halogens such as thiophosphoryl halide, in the presence of a halogen acceptor such as phosphorus, or sulfur under at least autogenous pressure at a temperature of from 200°C. to 450°C. The compounds obtained are useful as constituents in insecticides, fungicides, pharmaceuticals, and as intermediates in preparation of other organophosphorus compounds.

8 Claims, No Drawings

PROCESS FOR PREPARING ALKYL AND ARYL PHOSPHONOTHIOIC AND PHOSPHINOTHIOIC HALIDES

The present invention relates to a new and improved process for the preparation of alkyl or aryl phosphonothioic dihalides, and dialkyl or diaryl phosphinothioic monohalides.

BACKGROUND OF THE INVENTION

Alkyl phosphonothioic dihalides have been prepared in the prior art by reacting alkyl halides with phosphorus trihalides in the presence of aluminum chloride, followed by sulfurization of the reaction product. The alkyl halide/phosphorus trihalide reaction proceeds at room temperature according to the formula set forth in Heuben-Weyl, Methoden der Organis Chenchemie at Volume 12, Part 1 (1965) at page 396:

I. $XR - Cl + PCl_3 + AlCl_3 \rightarrow XR - PCl_4, AlCl_3$

The Heuben-Weyl reference also notes that the reaction has been attempted in the absence of the aluminum chloride catalyst with little success. The reaction has the disadvantage that one mole of aluminum chloride is lost for each mole of product prepared.

The reaction product must be sulfurized to obtain the phosphonothioic dihalide product. A.M. Kinnear and E.A. Perren, Journal Chem. Soc. 3437 (1952) showed that $(EtPCl_3)(AlCl_4)$ can be sulfurized with $H_2S$. It gave a yield of only 32% $EtPSCl_2$ while obtaining a 47 percent yield of a by-product $EtPS_2$. Alkyl or aryl phosphorus dichloride can also be converted to $RP(S)Cl_2$ by heating with sulfur.

THE INVENTION

In accordance with the present invention there is provided a new method for preparing compounds of the formula II. 

wherein R is a $C_1$ to $C_{20}$ alkyl radical, cycloalkyl of 5–6 carbons in the ring, an aralkyl radical of up to two fused rings, the alkyl portion having from one to 20 carbons, an aryl radical of up to three fused rings, or biphenyl, X is a halogen of chlorine or bromine, and $R_1$ represents groups as defined under R and X above. The method comprises reacting an alkyl or aryl halide of the formula:

III. RX with a phosphorus compound of the formula

IV. $R_1P(S)X_2$ in the presence of a halogen acceptor such as sulfur or phosphorus wherein R, $R_1$ and X are as defined above. The reaction is conducted at a temperature of from about 200°C. to about 450°C. under at least autogenous pressure. When $R_1$ equals X, the phosphonothioic compound is formed. When $R_1$ equals R, only the phosphinothioic compounds are formed. The process of the present invention requires no separate catalyst in order to effect reaction. The preferred reactants are the chloro compounds. The preferred halogen acceptor is phosphorus. The preferred system uses thiophosphoryl chloride. Some of the dihalide or monohalide products are known and have utility as chemical intermediates — particularly in the preparation of insecticides, fungicides, pharmaceuticals, and other organophosphorus compounds.

In formula II, X is a halogen of chlorine or bromine, preferably chlorine. For most intermediate type reactions, chlorine is preferred as it is inexpensive and reacts readily. Bromine, though equivalent to chlorine, is more expensive and can be used with facility if desired, particularly for special purposes, e.g., in the preparation of bromine containing intermediates for flame retardant compounds. Basically, and for practical purposes, chlorine is the preferred entity.

In formula II, R can be a $C_1$ to $C_{20}$ alkyl group and preferably the $C_1$ to $C_4$ alkyl group. The term alkyl is also intended to include alkyl groups modified by non-interfering substituents such as aryl, i.e., aralkyl, e.g., benzene or naphthalene groups; as well as halogen (Cl and Br) and the like. The alkyl groups are represented by methyl, ethyl, n-propyl, and isopropyl, n-butyl, isobutyl, and tert-butyl, as well as pentyl, hexyl, heptyl, octyl, nonyl, decyl, dodecyl tetradecyl, hexadecyl, octodecyl, and eicosyl. Since the definition of the alkyl halide includes compounds having more than one halogen attached thereto, and since it is possible to displace less than the number of available halogen atoms, the R group attached to the phosphorus can be a halosubstituted R group. These are less desirable due to possible byproduct formation which lowers yield of the desired final product. These halosubstituted R groups can be illustrated by chloromethyl, chloroethyl, chloropropyl, chlorobutyl, chloroamyl, chlorodecyl, chlorohexadecyl, chloroeicosyl, and the like as well as the bromine and derivatives thereof.

Any of these radicals can contain one or more alkyl radicals. Any isomeric form of these radicals can be used.

R can also be an aryl of up to (and including) three fused rings.

These aromatic compounds include the benzene series of ring compounds, the naphthalene series of compounds as well as the anthracene series and preferably those of the benzene series. Included within each series are those compounds wherein the ring hydrogens are substituted with non-interfering groups. Some of these non-interfering groups can be illustrated by the $C_1$ to $C_4$ alkyl derivatives and the chloro, and bromo substituted rings which are given only as illustrative of the many equivalent groups which could be used by one skilled in the art. These radicals can be illustrated by phenyl, chlorophenyl, bromophenyl, methylphenyl, i.e., (tolyl), ethylphenyl, propylphenyl, and butylphenyl, napthyl, methylnaphthyl, ethylnaphthyl, propylnaphthyl, butylnaphthyl, chloronaphthyl, bromonaphthyl, anthryl, methylanthryl, propylanthryl, butylanthryl, chloroanthryl, and bromoanthryl, as well as mixed forms thereof such as dimethylphenyl, methylchlorophenyl, dimethylnapthyl, methylchloronaphthyl, diethylanthryl, ethylchloroanthryl, and the like.

Any of these radicals can contain one or more alkyl radicals and/or one or more halogen groups. Any isomeric form of these radicals can be used.

The R group can also be biphenyl. Also included in the term biphenyl are the $C_1$ to $C_4$ derivatives such as methylbiphenyl and ditolyl and the halosubstituted derivatives of biphenyl. The substituents can be one or more as desired in any isomeric position desired. The R group can be attached to the phosphorus $o, m,$ or $p$ to biphenyl linkage though the ortho position is preferred. The chloro derivatives are contemplated as particularly usable.

The $R_1$ group can be the same as discussed above in connection with R or, additionally, a halogen of chlorine, or bromine. The $R_1$ group is preferably a halogen and more preferably the same halogen as the X group. Preferably the halogen is chlorine. When $R_1$ is a halogen the compounds prepared are termed phosphonothioic dihalides. When $R_1$ is not halogen, the compounds are termed phosphinothioic monohalides. The preferred group of compounds prepared by the invention are the phosphonothioic dihalides.

The compounds of the present invention are prepared by reacting a pentavalent thiophosphorus halide with an alkyl or aryl halide having one or more than one attached halogen in the presence of a halogen acceptor. The halogen acceptor can be any organic or inorganic compound capable of accepting or tying up the halogen under the conditions of reaction and without adversely affecting the chemical mechanism of reaction. It has been found that elemental phosphorus (white, yellow, or red) is particularly effective. Other materials which can effectively be used: Sulfur (in all its forms), antimony pentasulfide, arsenic pentasulfide, boron pentasulfide, as well as organic disulfides ($R_xSSR_x$) such as dimethyl disulfide, diethyldisulfide, diphenyldisulfide and the like. The halogen acceptors are preferably non-reactive with the basic reaction other than to accept the byproduct halogen. Organic materials such as the disulfides, can be used even though they may contribute to the reaction. The groups on the disulfide are preferably chosen to correspond with the groups on the product being prepared so that the reaction will not be adversely affected. The alkyl or aryl halide used in the present invention can be depicted by the formula:

$$RX$$

wherein R and X are as defined hereinbefore. Representative compounds within this formula are methyl chloride, ethyl chloride, propyl chloride, butyl chloride, hexyl chloride, octyl chloride, decyl chloride, dodecyl chloride, hexadecyl chloride, octydecyl chloride, eicosyl chloride, and the corresponding bromo substituted derivatives; and chlorobenzene, bromobenzene, chlorotoluene, chloroethyl benzene, bromoethyl benzene, chloropropyl benzene, bromopropyl benzene, chlorobutyl benzene, bromobutyl benzene, chloromethyl naphthalene, bromomethyl naphthalene, chloroethyl naphthalene, bromoethyl naphthalene, chloropropyl naphthalene, bromobutyl naphthalene. Isomeric forms of the same compound are also included. These are intended to be included in the definition of the compound. The foregoing compounds are given as illustrative and are in no way considered to be totally inclusive of all of the alkyl and aralkyl halides which can be used in the method of the present invention.

The pentavalent thiophosphorus halide used in the present invention can be depicted by the formula (V):

$$R_1P(S)X_2$$

the radical X is a halogen of chlorine or bromine. The discussion given hereinbefore regarding the halogen on the alkyl halide is equally applicable here. Thus, and for most chemical intermediate purposes, the chlorine is preferred. The bromine species can be prepared if desired.

The $R_1$ group includes the same moieties listed and discussed above in connection with the R group. That material is equally applicable in reference to the pentavalent thiophosphorus halide. Further, $R_1$ can be, and preferably is, a halogen or chlorine, or bromine. For the considerations discussed above, the halogen is preferably chlorine.

Representative pentavalent thiophosphorus halides are thiophosphorus chloride, thiophosphoryl bromide, mixed phosphorus halides such as dichlorothiophosphoryl bromide and dibromothiophosphoryl chloride; methylphosphonothioic dichloride, ethylphosphonothioic dibromide, isopropylphosphonothioic dichloride, benzylphosphonothioic dichloride phenylphosphonothioic dichloride, cyclohexylphosphonothioic dichloride, decylphosphonothioic dichloride, hexadecylphosphonothioic dichloride, eicosylphosphonothioic dichloride, naphthylphophonothioic dichloride, anthracylphosphonothioic dichloride, biphenylphosphonothioic dichloride, tolylphosphonothioic dichloride, and the like. For economical reasons, the pentavalent thiophosphorus halide is preferably thiophosphoryl chloride. Mixtures of pentavalent thiophosphorus halides can be used without departing from the scope of the invention.

Stoichiometrically, the present reaction appears to require a ratio of 1 mole of the alkyl halide (or other RX compound) and 1 mole of the pentavalent thiophosphorus halide to prepare one mole of the product and one mole of halogen by-product. As each halogen acceptor may accept more than one halogen, the theoretical stoichiometry of the reaction will be adjusted according to the capacity of the acceptor to tie up the liberated halogens. For example, theoretical reaction schemes can be postulated for phosphorus and sulfur halogen acceptors as follows:

$$3RX + 3P(S)X_3 + 2P \rightarrow 3RP(S)X_2 + 2PX_3$$

$$RX + P(S)X_3 + S \rightarrow RP(S)X_2 + (SCl_2)$$

This is only a postulated reaction mechanism and Applicants do not intend to limit their process thereto. The stoichiometry would be adjusted accordingly as the ability of the halogen acceptor to tie up halogen varied.

The process of the present invention is carried out at elevated temperature and at least at autogenous pressure. Temperatures of between about 200°C. and about 450°C. can be used though temperatures of 250°C. to 350°C. are generally employed. The method of the present invention may conveniently be effected by introducing the individual reactants into a reaction zone capable of withstanding elevated pressure, such as a metal bomb, autoclave, or other pressure vessel, and carrying out the reaction under at least the autogenuous pressure developed by the reactants at the reaction temperature. Pressures of up to 200 atmospheres above the autogenuous pressure can also be used but are less desirable due to the inconvenience of requiring a pressurization system. The time of reaction may vary over relatively wide limits such as between about 1 to 20 hours, but the preferable reaction time has been found to be between about 5 and 15 hours.

In general, the reaction equipment should be a pressure vessel. The vessel should be equipped with an agitation mechanism (a rocker, vibrator, or stirrer) for best results. The reaction proceeds easily. Also, and since the phosphoryl halide is decomposed by water, care is to be taken to avoid the presence of water in the system.

The reaction may be carried out in continuous or batchwise systems as desired. The reaction may also be conducted in the presence of diluents which can be gaseous, liquid, or solid at room temperature such as benzene, toluene, hexane, and various other hydrocarbons such as: ethane, propane, cyclohexane, and biphenyl. Also, the pentavalent thiophosphorus halide, $R_1P(S)X_2$ can often be present in excess to act as a diluent.

The products of the reaction are purified by conventional methods such as by fractional distillation of liquids and crystallization or extraction of solid products. The identification of products is achieved by conventional methods, such as elemental analysis, and gas chromatography for purity and mass spectrometer and nuclear magnetic resonance phosphorus NMR and infrared and analysis to establish structure.

Illustrative of the compounds which can be prepared by the method of the present invention are:

$CH_3P(S)Cl_2$
$CH_3P(S)Br_2$
$C_2H_5P(S)Cl_2$
$C_3H_7P(S)Cl_2$
$C_4H_9P(S)Cl_2$
$C_4H_9P(S)Br_2$
$C_5H_{11}P(S)Cl_2$
$C_8H_{17}P(S)Br_2$
$C_{16}H_{38}P(S)Cl_2$
$C_{18}H_{37}P(S)Cl_2$
$(CH_3)_3C-CH_2P(S)Cl_2$
$CH_3(CH_2)_4-CH-(C_2H_5)CH_2P(S)Cl_2$

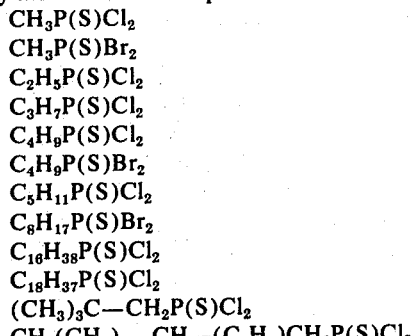

Dialkyl and Mixed Alkyl
 $(CH_3)_2P(S)Br$
 $(C_2H_5)_2P(S)Br$
 $(C_4H_9)_2P(S)Cl$
 $(C_8H_{17})_2P(S)Cl$
 $(C_8H_{17})_2P(S)Br$
 $(C_{16}H_{33})_2P(S)Cl$
 $(C_{18}H_{37})_2P(S)Cl$
 $(C_{18}H_{37})_2P(S)Br$
 $(CH_3)(C_2H_5)P(S)Cl$
 $(C_2H_5)(C_{18}H_{37})P(S)Cl$
 $(C_2H_5)(C_{18}H_{37})P(S)Cl$
 $(C_2H_5)(C_{18}H_{37})P(S)Br$ Dihaloalkyl and mixed Haloalkyl
 $(ClCH_2)_2P(S)Cl$
 $(ClCH_2)_2P(S)Br$
 $(ClC_2H_4)_2P(S)Cl_2$
 $(ClC_3H_7)_2P(S)Cl_2$
 $(ClCH_2(CH_2)_8)_2P(S)Cl_2$
 $(ClC_2H_4)(ClCH_2(CH_2)_{18}P(S)Cl_2$
 $(ClCH_2)(BrCH_2)P(S)Cl$

CYCLIC COMPOUNDS *

Aromatic Series
Benzene Series

| Ring Substituent | Y | $R_1$ | X |
|---|---|---|---|
| | S | Cl | Cl |
| | S | Br | Br |
| $CH_3$ | S | Cl | Cl |
| Cl | S | Cl | Cl |
| $C_2H_5$ | S | Cl | Cl |
| $C_4H_9$ | S | Cl | Cl |

\* Reference characters correspond to formula III

Naphthalene Series

| Ring Substituent | Y | $R_1$ | X |
|---|---|---|---|
| | S | Cl | Cl |
| | S | Br | Br |
| $CH_3$ | S | Cl | Cl |
| $C_2H_5$ | S | Br | Br |
| Cl | S | Cl | Cl |
| Br | S | Br | Br |
| $-P(S)Cl_2$ | S | Cl | Cl |

Anthracene Series

| | S | Cl | Cl |
|---|---|---|---|
| $-P(S)Cl_2$ | S | Cl | Cl |
| $CH_3$ | S | Cl | Cl |
| $C_2H_5$ | S | Cl | Cl |
| Cl | S | Cl | Cl |

Biphenyl Series

| | S | Cl | Cl |
|---|---|---|---|
| | S | Br | Br |
| 4'—$CH_3$ | S | Cl | Cl |
| 4'—Cl | S | Cl | Cl |
| 4'$P(S)Cl_2$ | S | Cl | Cl |

Aliphatic Series
5 Membered Carbon Ring

| Ring Substituent | Y | $R_1$ | X |
|---|---|---|---|
| | S | Cl | Cl |
| $P(S)Cl_2$ | S | Cl | Cl |

6 Membered Carbon Ring

| | S | Cl | Cl |
|---|---|---|---|
| $P(S)Cl_2$ | S | Cl | Cl |

The products of the present invention are monohalides or dihalides of pentavalent phosphorus and, therefore, can be subject to all the known reactions which such compounds undergo. The compounds of the invention can be used as intermediates to make insecticides as illustrated by the process for making O-ethyl S-phenyl ethylphosphonothioate as per the following illustrative reaction scheme:

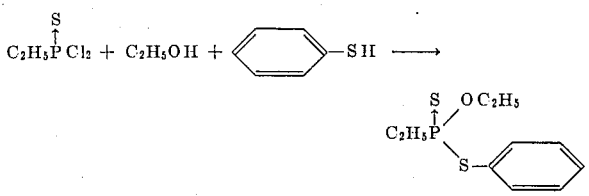

The compounds of the invention can be hydrolyzed to form the corresponding phosphonothioic (if $R_1$ equals X) or phosphinothioic (if $R_1$ equals R) acids. The sodium salts of the acids can also be prepared. Other uses would be obvious to one skilled in the art.

The sulfur compounds are also usable as insecticides.

The present invention will be more fully illustrated in the Examples which follow:

EXAMPLE I

Preparation of Methyl Phosphonothioic Dichloride $$3CH_3Cl + 3P(S)Cl_3 + 2P \rightarrow 3CH_3P(S)Cl_2 + 2PCl_3$$

In a 60 milliliter Pyrex Carius Tube (a thick walled glass tube which is sealed to run pressure reactions) were placed 10.7 grams (0.0635 moles) thiophosphoryl chloride
1.3 grams (0.042 gram atoms) yellow phosphorus and
3.2 grams (0.064 moles) methyl chloride The Carius tube was sealed and placed in a 300 milliliter autoclave containing 50 milliliters of hexane to prevent the glass tube from breaking. The autoclave was heated at 280° C. (heat up time 1 hour) for 16 hours. The autoclave was rocked during this heating period. After cooling, the sealed glass tube was removed from the autoclave. The tube was opened and 14.7 grams of crude liquid product was removed. The contents were assayed by gas-liquid chromatography with internal standard added.

Analysis showed following:
4.7 grams methylphosphonothioic dichloride ($CH_3P(S)Cl_2$) (desired product)
6.8 grams phosphorus trichloride (expected by-product)
0.16 grams thiophosphoryl chloride (unreacted)
1.0 grams (unknown)
Nondistillable residue equalling 2.6 percent does not distill at 100° C. at 0.1 mm Hg pressure.

Yield based on $P(S)Cl_3$ was 50.5 percent. Nuclear Magnetic Resonance (phosphorus), NMR, spectra confirmed material to be $CH_3P(S)Cl_2$ when compared to the NMR spectra of a known sample of $CH_3P(S)Cl_2$.

EXAMPLE 2

$$CH_3Cl + P(S)Cl_3 + 0.125S_8 \rightarrow CH_3P(S)Cl_2 + SCl_2$$

Using the same procedure as in Example 1, in a 60 milliliter Pyrex Carius Tube were placed 8.4 grams (0.0496 moles) thiophosphoryl chloride
3.2 grams (0.1 gram atoms) rolled sulfur and
2.5 grams (0.05 moles) of methyl chloride.

After sealing, the Carius Tube was placed in the autoclave and heated at 295° C. for 17 hours (heat up time was 1 hour). After cooling the contents of the glass tube were removed.

The yield of crude liquid product was 11.3 grams and 1.1 grams of gas which was HCl.

The crude product was assayed by gas-liquid chromatography with internal standard added. The results are:

3.18 g $CH_3P(S)Cl_2$
0.50 g $PCl_3$ (by-product)
4.20 g $P(S)Cl_3$ (unreacted)
2.46 g $SCl_2$
0.5 g (high boiling material)

Distillation of the crude product showed that 9.7 percent did not distill below 100° C. at 0.1 mm pressure.

Yields were found to be 50 percent $P(S)Cl_3$ converted. Of the $P(S)Cl_3$ converted, 86 percent formed product.

The nuclear magnetic resonance spectra confirmed the presence of $CH_3P(S)Cl_2$ in the amount indicated by gas liquid chromatography analysis.

The following example was run in a 300 milliliter 316 stainless steel autoclave having a 5,000 pounds per square inch gravity rupture disc.

EXAMPLE 3

$$3 CH_3Cl + 3P(S)Cl_3 + 0.2P \rightarrow 3CH_3P(S)Cl_2 + 2PCl_3$$

The following were placed in the autoclave.
50.7g $PSCl_3$ (0.3 moles)
6.2g yellow phosphorus (0.2 gram atoms) and
15.1g methyl chloride (0.3 moles).

The autoclave was heated at 265° C. for 17½ hours (1 hour heat up time). After cooling, the contents of the autoclave were placed in a distillation flask. The distilled product, $CH_3P(S)Cl_2$, weighed 15.7g.

Analysis calculated for $CH_3P(S)Cl_2$:
Theoretical: Cl, 47.5; P, 20.8; S, 21.5.
Found: Cl, 47.2; P, 20.5; S, 21.7.
The yield of $CH_3P(S)Cl_2$ is 30.5 percent of theoretical yield.

EXAMPLE 4

Preparation of phenylphosphonothioic dichloride.

$$3\phi Cl + 3P(S)Cl_3 + 2P \rightarrow 3\phi P(S)Cl_2 + 2PCl_3$$

In a 300 milliliter 316 stainless steel autoclave with a 5,000 pounds per square inch rupture disc were placed 51.0 grams $P(S)Cl_3$ (0.3 mole), 34.0 grams chlorobenzene (0.3 mole) and 6.0 grams yellow phosphorus (0.2 gram atoms). The autoclave was heated to 300°C. for 14 hours with rocking for agitation. After cooling, 87 grams of yellow liquid was poured from the autoclave. The product was distilled at 1.5 millimeters mercury pressure at a vapor temperature of 90°C. – 100°C. The yield of product was 39 grams or 62 percent of theoretical. The nuclear magnetic resonance spectra was identical to a known sample of phenylphosphonothioic dichloride.

EXAMPLE 5

Using the same procedure as described in Example 4, 34.0 grams $P(S)Cl_3$ (0.2 mole), 22.5 grams chlorobenzene (0.2 mole) and 6.4g rolled sulfur (0.2 gram atoms) were placed in the autoclave. The reaction mass was heated at 270°C. for 18 hours. On distillation of the crude product obtained 15.3 grams phenylphosphonothioic dichloride.

All other compounds within the scope of the invention can be easily prepared by using the foregoing procedures and the corresponding reactants, some of which have been specifically listed hereinbefore, and the remainder being within the grasp of those skilled in the art.

The present invention is defined in the claims which follow.

What is claimed is:

1. A method for preparing compounds of the formula:

$$R-P{\overset{S}{\underset{}{\nwarrow}}}{\overset{R_1}{\underset{X}{\diagdown}}}$$

wherein R is a $C_1$ to $C_{20}$ alkyl radical, cycloalkyl of 5–6 carbons in the ring, an aralkyl radical of up to two fused rings, the alkyl portion having from one to 20 carbon atoms, an aryl radical of up to three fused rings and biphenyl, $R_1$ represents a $C_1$ to $C_{20}$ alkyl radical, cycloalkyl of 5-6 carbons on the ring, an aralkyl radical of up to two fused rings, the alkyl portion having from one to 20 carbon atoms, an aryl radical of up to three fused rings, biphenyl, or a halogen of chlorine or bromine, X is a halogen of chlorine or bromine, comprising reacting, under at least an autogenous pressure at a temperature of from about 200°C., to about 450°C. and halide of the formula:

RX wherein R and X are as defined above with a pentavalent thiophosphorous halide of the formula:

$R_1P(S)X_2$ wherein $R_1$ and X are as defined above, in the presence of a halogen acceptor.

2. The method as recited in claim 1 wherein $R_1$ is halogen.

3. The method as recited in claim 1 wherein $R_1$ and X are chlorine.

4. The method as recited in claim 1 wherein R is a $C_1$ to $C_4$ alkyl.

5. The method as recited in claim 1 wherein said reaction is conducted at a temperature of from about 250°C. to about 350°C.

6. The method as recited in claim 1 wherein R is a $C_2$ alkyl and wherein the reaction mixture further includes a hydrocarbon diluent selected from the group consisting of benzene, ethane and cyclohexane.

7. The method as recited in claim 1 wherein said halogen acceptor is elemental phosphorus.

8. The method as recited in claim 1 wherein said halogen acceptor is elemental sulfur.

* * * * *